United States Patent [19]
Bennitt et al.

[11] Patent Number: 5,622,332
[45] Date of Patent: Apr. 22, 1997

[54] APPARATUS FOR AND METHOD OF WINDING LAYERS OF WIRE ON A ROTOR OR STATOR OF A ROTARY ELECTRIC GENERATOR OR MOTOR

[75] Inventors: Christopher T. Bennitt, Hemel Hempstead; John Rich, Linslade; Geoffrey A. Rogers, Berkhamsted, all of United Kingdom

[73] Assignee: Lucas Industries plc, Great Britain

[21] Appl. No.: 437,954

[22] Filed: May 10, 1995

[30]     Foreign Application Priority Data

May 18, 1994 [GB] United Kingdom ............... 9409870

[51] Int. Cl.⁶ ......................................... B65H 18/00
[52] U.S. Cl. ............... 242/439; 242/432.6; 242/433.4
[58] Field of Search ........................ 242/432.6, 432.5, 242/439, 433.4

[56]             References Cited

U.S. PATENT DOCUMENTS

| | | | |
|---|---|---|---|
| 1,370,744 | 3/1921 | Diehl | 242/432.6 |
| 1,407,033 | 2/1922 | Huggins | 242/432.6 |
| 1,595,396 | 8/1926 | Herrick | 242/432.6 |
| 2,389,336 | 11/1945 | Wirth | 242/432.6 |
| 3,270,969 | 9/1966 | Greene et al. | 242/432.6 |
| 3,334,825 | 8/1967 | Friedrich | 242/432.6 |
| 3,450,357 | 6/1969 | Olson | 242/432.6 |
| 3,877,142 | 4/1975 | Hamano et al. . | |
| 4,612,702 | 9/1986 | Wheeler . | |
| 4,844,356 | 7/1989 | Koizumi et al. . | |
| 4,858,835 | 8/1989 | Luciani et al. . | |
| 4,991,782 | 2/1991 | Luciani . | |

FOREIGN PATENT DOCUMENTS

| | | |
|---|---|---|
| 86200364 | 3/1986 | European Pat. Off. . |
| 0397964 | 11/1990 | European Pat. Off. . |
| 93105988 | 4/1993 | European Pat. Off. . |
| 2054676 | 3/1983 | United Kingdom . |

*Primary Examiner*—Katherine Matecki
*Attorney, Agent, or Firm*—Barnes & Thornburg

[57]             ABSTRACT

An apparatus for winding layers of wire on a pole of a rotor or stator of a rotary electrical generator or motor comprises a needle mounting member movable substantially axially of the rotor or stator and a needle rotatably mounted on the mounting member and extending transversely thereto. The needle is rotatable about an axis transverse to the direction of movement of the mounting member. The needle has a groove defining an outlet path for the wire to one side of the axis of rotation of the needle.

A method of winding layers of wire on a pole of a rotor or stator of a rotary electrical generator or motor comprises the steps of providing a needle having a groove defining an outlet path for wire to be wound in layers, moving the needle over a winding path and causing the needle to rotate at positions in the winding path.

26 Claims, 4 Drawing Sheets

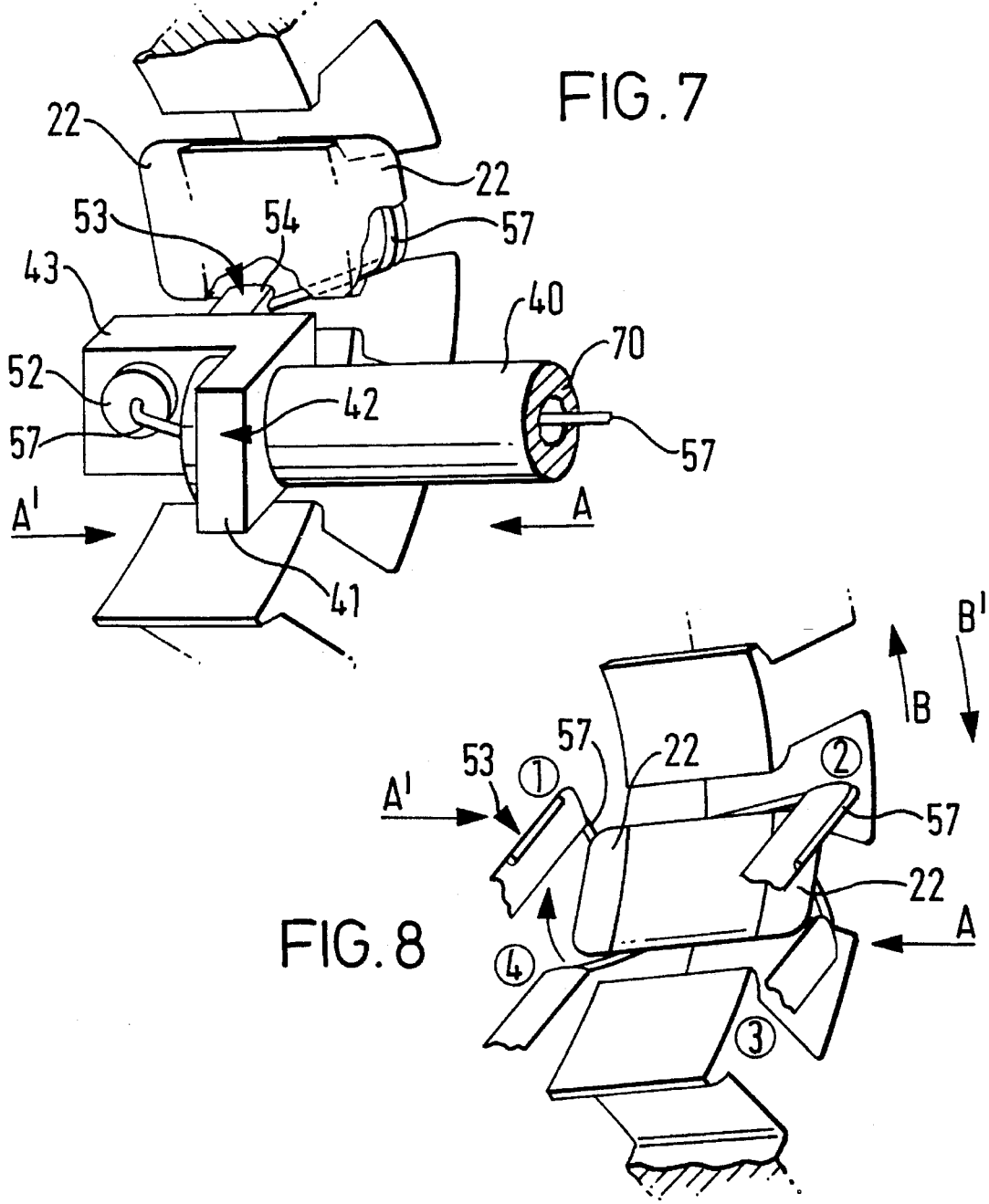
FIG. 7
FIG. 8
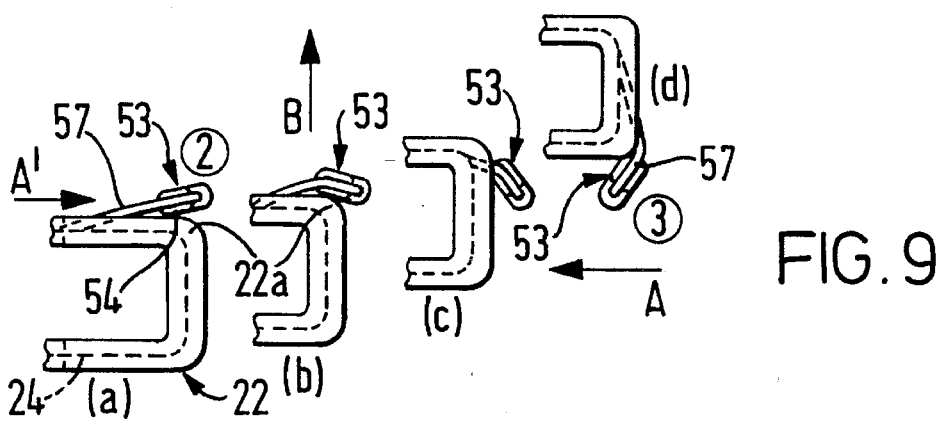
FIG. 9

APPARATUS FOR AND METHOD OF WINDING LAYERS OF WIRE ON A ROTOR OR STATOR OF A ROTARY ELECTRIC GENERATOR OR MOTOR

BACKGROUND AND SUMMARY OF THE INVENTION

The invention relates to apparatus for and a method of winding layers of wire on a rotor or stator of an electric generator or motor.

It has been proposed hitherto to wind wire around the poles of a rotor or stator using winding apparatus comprising a needle through which the wire passes which is reciprocable alongside the poles and movable past ends of the poles. Examples of such apparatus are shown in U.S. Pat. Nos. 4,612,702 and 4,991,782. In the arrangements described, the wire is wound in a random manner around the poles (known in the art as "scramble winding") one of the objects being to dispense with winding shoes or forms (referred to herein as "winding shields") which are normally required to ensure that the windings are guided around the ends of the poles.

In both of the above prior specifications, the wire to be wound is of a relatively thin type, typically up to around 0.4 mm in diameter and the outlet in the needle for the wire in each case can be many times greater than the diameter of the wire making the needle cheap to produce. All that is required to guide the wire out of the needle is the provision of a polished trumpet or similar outlet at the end of the needle through which the wire can pass. With scramble winding, there is no requirement that the windings be "layered", that is arranged in a number of specific layers, each being formed by winding a much thicker wire, e.g. over 1.2 mm in diameter, so that the turns in each layer are accurately wound side by side in a parallel fashion.

The scramble winding machines shown in the above specifications are not suitable for layer winding and it has been proposed hitherto to utilise a machine having a heavy duty needle which is controlled by computer in order to ensure the accurate placing of the wire in layers as described above. The heavy duty needle is invariably of large transverse cross section in view of the substantial thickness of the wire to be wound and so as to be resistant to bending. That, in itself, can create problems when there is only a narrow gap between the poles around which the wire is to be wound. In such cases, and particularly in newer designs of electric generators and motors, the width of the needle becomes the restricting factor in relation to the thickness of wire which can be wound. Also the wire exits the needle at 90 degrees and the needle must be of sufficient thickness to accommodate the forming of a radius over which the wire passes as it exits the needle. If the radius is insufficient, damage is caused to the insulation coating on the wire which can adversely affect the reliability of the finished product. An object of the present invention is to provide an improved apparatus and method for winding layers of wire on a stator or rotor of an electric generator or motor.

According to one aspect of the invention there is provided apparatus for winding layers of wire on a pole of a rotor or stator of a rotary electric generator or motor, the apparatus comprising a needle mounting member movable substantially axially of the rotor or stator and a needle rotatably mounted on the mounting member and extending transversely thereto, the needle being rotatable about an axis transverse to the direction of movement of the mounting member and having an outlet path for the wire to one side of the axis of rotation of the needle.

According to another aspect of the invention there is provided a method of winding layers of wire on a pole of a rotor or stator of a rotary electric generator or motor comprising the steps of providing a needle having an outlet path for wire to be wound in layers, moving the needle over a winding path and causing the needle to rotate at positions in the winding path.

With an arrangement or method according to the invention, the needle can turn naturally with the wire to follow a winding pattern when the winding direction changes from laying wire along one side of the pole to laying wire across an end. Therefore, it is possible to give the needle a substantial dimension in the direction of winding movement of the needle to make the needle particularly resistant to bending due to the drag of wire thereon as it exits the needle over the outlet path. At the same time, the needle can be given a much smaller dimension in a direction transverse to the winding direction to enable it to pass through a narrow gap between adjacent poles. The invention, therefore, reduces substantially the problems encountered with previously known needles and the method provides the advantages of the speed of machine winding with the accuracy and controllability of hand winding.

Preferably, the path comprises a groove at the distal end of the needle, the groove extending away from the needle axis. In use, the groove will tend to extend in the winding direction because the wire exiting the needle over the groove will tend to steer the needle to follow the winding pattern. In effect, the tension in the wire as it is wound around the pole will tend to create a kind of castor action on the needle.

The needle is preferably arranged so that a first section thereof is mounted in bearing means to facilitate rotation thereof and a second section thereof extends from the first section to one side of the axis of rotation of the needle, the second section having the distal end at which the path is formed.

In a preferred embodiment, the apparatus is combined with a winding shield on the pole which projects beyond an axial end of the pole to keep the wire wound thereon in place during the winding process. In such a case, the needle is arranged to make contact with the shield preferably as the needle changes from winding the wire on one side of the pole following movement of the needle axially of the stator or rotor to winding the wire on an end of the pole. The contact between the shield and the needle is preferably arranged to turn the needle about its axis of rotation by 90 degrees.

As the needle changes from winding the wire across the end of the pole to winding the wire along the other side of the pole, the needle and the winding shield are preferably arranged to make contact with each other again, the contact being arranged to turn the needle again about its axis of rotation preferably by up to 90 degrees.

The use of the winding shield to turn the needle is most useful in that it is not necessary to rely upon tension in the wire alone to turn the needle so that it will follow the winding pattern. Moreover, by using the winding shield in that way, the needle will be correctly orientated for each winding step in a winding cycle prior to beginning that step. Because the needle follows closely around the shields, the amount of travel required of the wire feeder bar is decreased, thus speeding up the winding of each stator. The winding shields also hold the conductor wire in position while the winding process takes place.

It is possible to dispense with winding shields on stators where insulators project above the windings and are of sufficient strength to act in place of a winding shield. In the winding of rotors it is only necessary to use winding shields if the configuration of the pole tip is not suitable for making contact with the needle during winding. On rotors with fixed pole ends the wire is supported by the pole tip during winding.

BRIEF DESCRIPTION OF THE DRAWINGS

An apparatus and method in accordance with the invention will now be described by way of example with reference to the accompanying drawings in which:

FIG. 7 is a perspective view of apparatus in accordance with the invention showing a needle thereof in position for winding wire on a pole of the stator, FIG. 8 is a view similar to FIG. 7 showing four positions of the needle in a winding cycle, and FIG. 9 is a diagrammatic view of one end of a pole in four different angular positions of the stator showing the way in which the winding shield contacts and turns the needle.

DETAILED DESCRIPTION OF THE DRAWING

Figure 1:
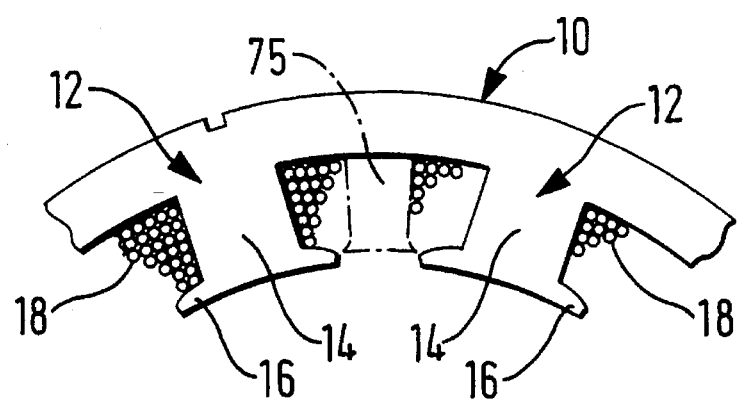
FIG. 1 is an elevation of part of a stator having poles on which wire is to be wound by apparatus in accordance with the invention.

In FIG. 1, a stator 10 has a plurality of circumferentially spaced apart poles 12 each comprising a radial section 14 and a circumferentially extending inner section 16. Each pole has thereon several layers of windings 18, each layer comprising a plurality of windings arranged side by side in parallel fashion. The windings have been laid by means of a needle which is described in detail below.

Figure 2:
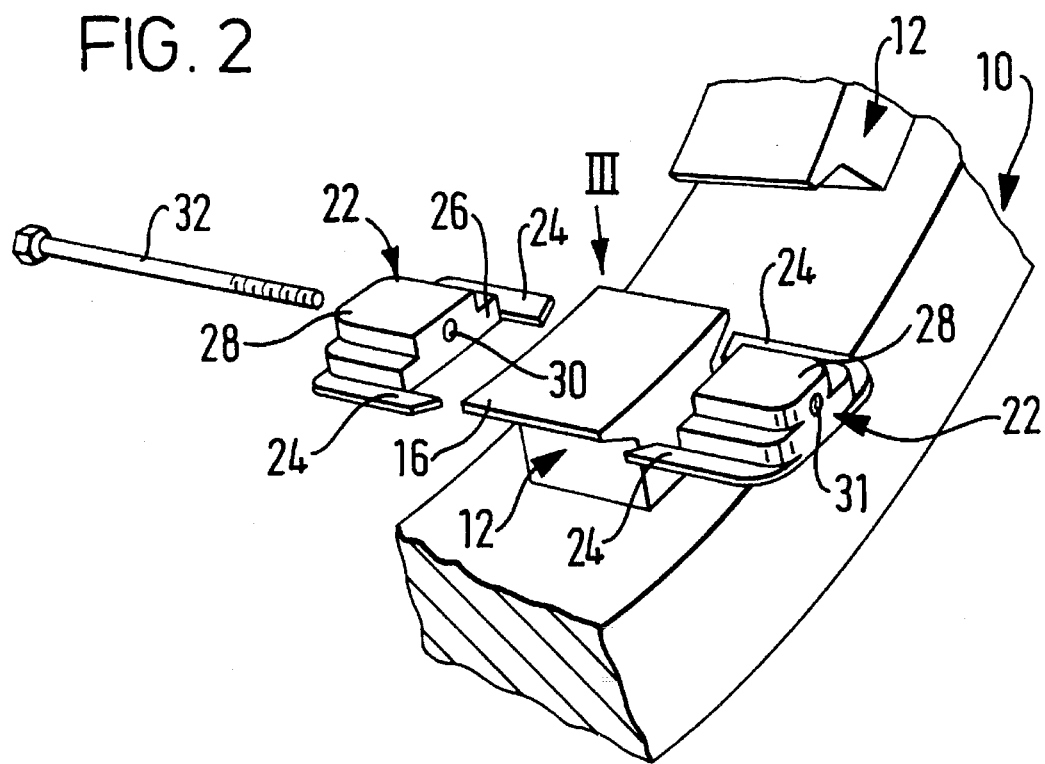
FIG. 2 is a diagrammatic perspective view of the stator showing winding shields about to be assembled on a pole.
Figure 3:
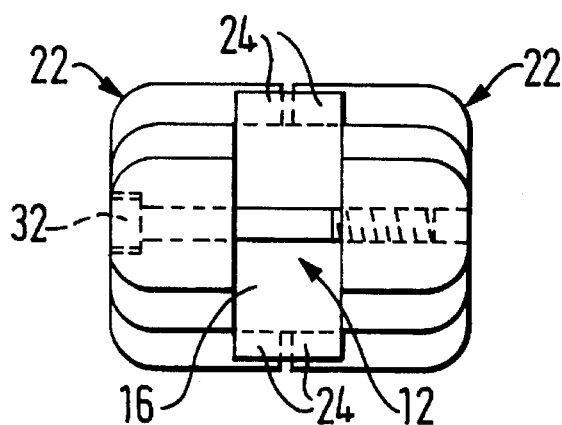
FIG. 3 is a view of the pole shown in FIG. 2 looking in the direction of arrow III in FIG. 2 and showing the assembled winding shields in position.

FIG. 2 shows a perspective view of part of the stator 10 and it will be seen that two winding shields 22 are provided for location on each of the poles 12. Each winding shield 22 comprises a substantially D-shaped plate having spaced apart fingers 24, arranged to locate beneath edges of the circumferential section 16 of the pole, and an abutment surface 26 arranged to abut one end of the circumferential section. A connector section 28 on the abutment section 26 of one winding shield 22 is formed with a through-hole 30 which receives a fixing bolt 32. The connector section 28 of the other winding shield 22 is formed with a screw threaded through hole 31 into which the fixing bolt 32 screws. The fixing bolt 32 thereby secures the shields 22 in position on the pole 12 as shown in FIG. 3.

With winding shields 22 located on the remaining poles 12, the stator 10 is mounted on a winding machine (not shown) which is arranged to index the stator 10 circumferentially as described below and which also carries a wire feed bar 40 (FIGS. 4 to 7) which is mounted on a computer controlled support (not shown) arranged to facilitate movement of the wire feed bar 40 axially of the stator 10 in the direction of arrows A, A'. The wire feed bar 40 carries a mounting member 42 at its left hand end as viewed in FIG. 4 and which is shown in detail in FIGS. 4 and 5.

The mounting member 42 comprises a first section 41 mounted on the wire feed bar 40 and a second section 43 bolted thereto. The second section 43 has a cylinder 44 integral therewith which houses spaced apart bearings 46 held in position between an in-turned annular end 47 and an annular retainer 48 press fitted into the other end of the cylinder 44. The bearings 46 are held spaced apart by a spacer member 50 and the bearings rotatably support a cylindrical section 52 of a needle 53. The cylindrical section 52 has an axis of rotation indicated at X and supports a finger 54 of the needle 53 arranged to one side of the axis of rotation X. The distal end of the finger 54 is formed with a groove 55 having a radiused bottom edge 60. The groove 55 defines the aforesaid outlet path for wire 57 to be wound on the stator 10 to form the windings 18. It will be noted that the cylindrical section 52 of the needle 53 is formed with a tapered through bore 62 and the adjacent end of the wire feed bar 40 is formed with a curved trumpet-like outlet 68 from a feed bore 70 extending through the wire feed bar 40. Wire 57 from the feed bar 40 extends through the tapered bore 62 in the cylindrical section of a needle 20 and through the outlet groove 55 at the distal end of the needle finger 54 as shown in broken lines in FIG. 4. The wire 57 is drawn from a reel (not shown) on the winding machine.

Figure 5:
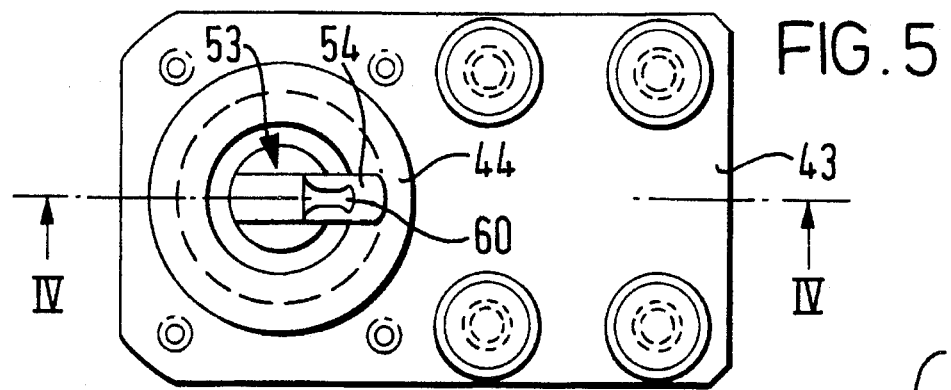
FIG. 5 is a plan view of the needle and mounting looking in the direction of arrow V in FIG. 4.
Figure 4:
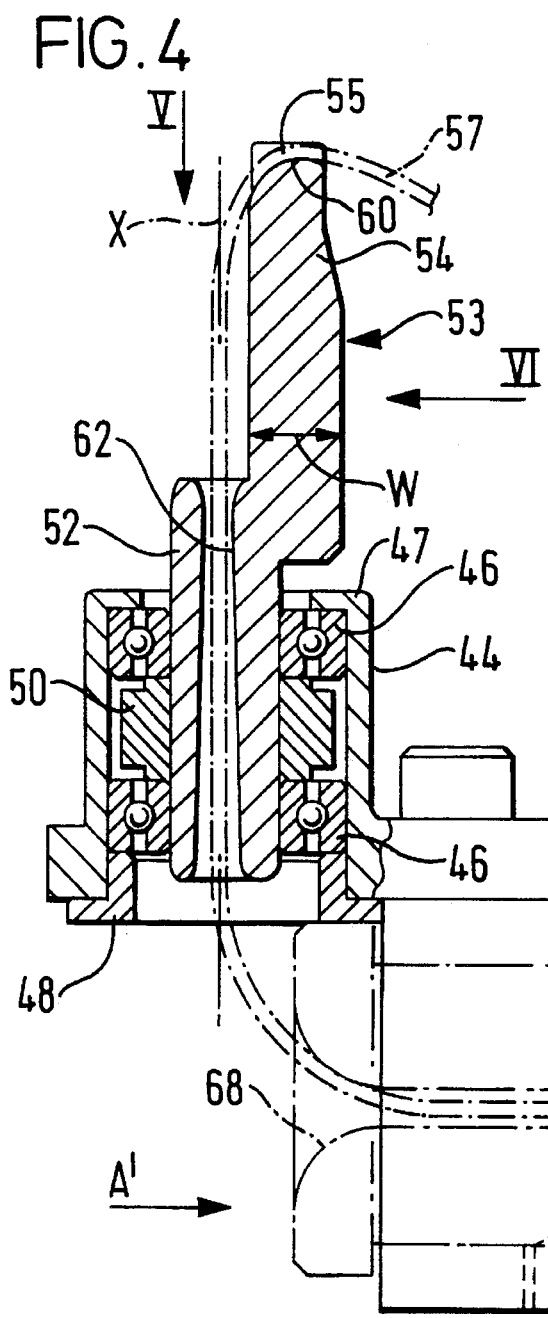
FIG. 4 is a cross section through a needle and a mounting therefor in accordance with the present invention on line IV—IV in FIG. 5.
Figure 6:
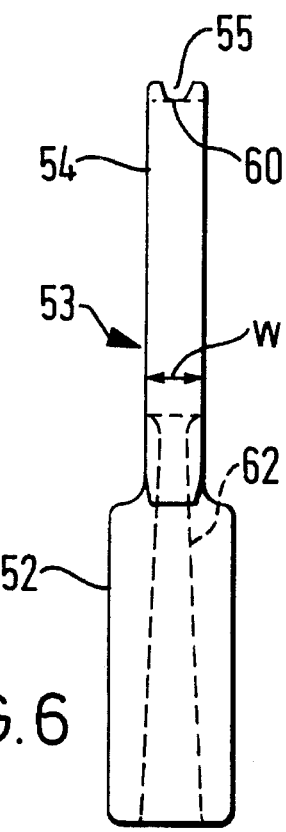
FIG. 6 is a view of the needle in FIG. 4 looking in the direction of arrow VI in FIG. 4.

As can be seen from FIGS. 4, 5 and 6, the finger 54 is of a generally rectangular form and has a width W in the directions of winding (directions A-A') greater than the width w transverse thereto. In use, the needle 53 extends transversely to the directions A-A' and is positioned so that the finger 54 extends between poles 12 of the stator 10 for winding wire 57 around one of the poles. With a free end of the wire 57 suitably retained on the stator 10, the needle 53 begins its winding cycle at position 1 in FIG. 8 and is moved in the direction A' towards position 2 by moving the wire feed bar 40 relative to the stator 10. The wire 57 slides over the surface 60 of the groove 55 in the finger 54 and is laid along one side of the pole 12. On reaching position 2 in FIG. 8, the stator 10 is indexed in direction B so that the wire 57 is wound across the right hand end of the pole 10 as viewed in FIG. 8 until the relative position between the stator 10 and the needle 53 corresponds to that shown at position 3. The wire feed bar 40 is then moved axially in the direction of arrow A to wind the wire 57 along the other side of the pole 12 until position 4 is reached. The stator 10 is then indexed in direction B' to wind the wire 57 across the left hand end of the pole 12 until the relative position between the needle 53 and the pole 12 corresponds to that shown at position 1.

The wire is of considerable thickness e.g. over 1.2 mm in diameter and as the relative position between the stator 10 and the needle 53 corresponds to positions 1–4, the tension on the wire 57 tends to rotate the needle 53 about the axis X by a castor action. However, by providing the winding shields 22, it is possible to re-orientate the needle 53 at positions 1-4 for the beginning of the next winding step in the cycle, the action of a winding shield 22 to turn the needle 53 being illustrated in FIG. 9 (a)–(b).

In FIG. 9 (a) the needle 53 moving in direction A' is about to reach position 2. On reaching position 2, the stator 10 moves in the direction B so that a corner 22a of the winding shield 22 contacts the finger 54 of the needle 53 as in FIG. 9 (b). Due to the finger 54 being offset from the axis X, continued movement of the stator 10 turns the needle 53 about axis X by approximately 90 degrees so that it takes up the position shown in FIG. 8 (c) prior to laying wire across the right hand end of the pole 10. Once the stator 10 has been fully indexed in direction B, the relative position between the pole 12 and the needle 53 will be that corresponding to the position 3. Axial movement of the wire feed bar 40 in the direction of arrow A then causes the winding shield 22 to contact the needle 53 again and rotate the needle about axis X by approximately 90 degrees as shown in FIG. 8 (d) so that the needle will be better orientated for laying the wire 57 across the other side of the pole 12.

It will be appreciated that the present invention enables the groove 55 defining the outlet path for the wire 57 at the distal end of the needle 53 to lie generally in the directions of winding i.e. A, A', B, B' and the rotary mounting of the needle 53 thereby enables the finger 54 of the needle to follow the generally rectangular winding pattern. Moreover, the rotary mounting for the needle 53, enables the width W of the finger 54 to be considerable so as to have substantial resistance to bending in the direction of the groove at the distal end (direction A' when moving from position 1 to position 2 in FIG. 8), whilst permitting the width w of the finger 54 to be minimised in the transverse direction. The relative slenderness of the needle in the transverse direction greatly facilitates the movement of the needle finger 54 between the winding shields 22 of adjacent poles 12. Therefore, the invention is particularly advantageous over prior systems where the needle has to be of substantial transverse cross-section in all directions making it difficult for the needle to apply windings of considerable thickness to stators where there are only small spaces between the poles 12. When the windings 18 formed by the wire 57 have been completed on the stator 10, the winding shields 22 are removed by extracting the bolts 32. Wedges 75 (FIG. 1) of known kind are then located in the spaces between the windings 18 to prevent the wire 57 of the windings 18 falling down inside the stator 10; the assembly is then impregnated.

Figure 10:
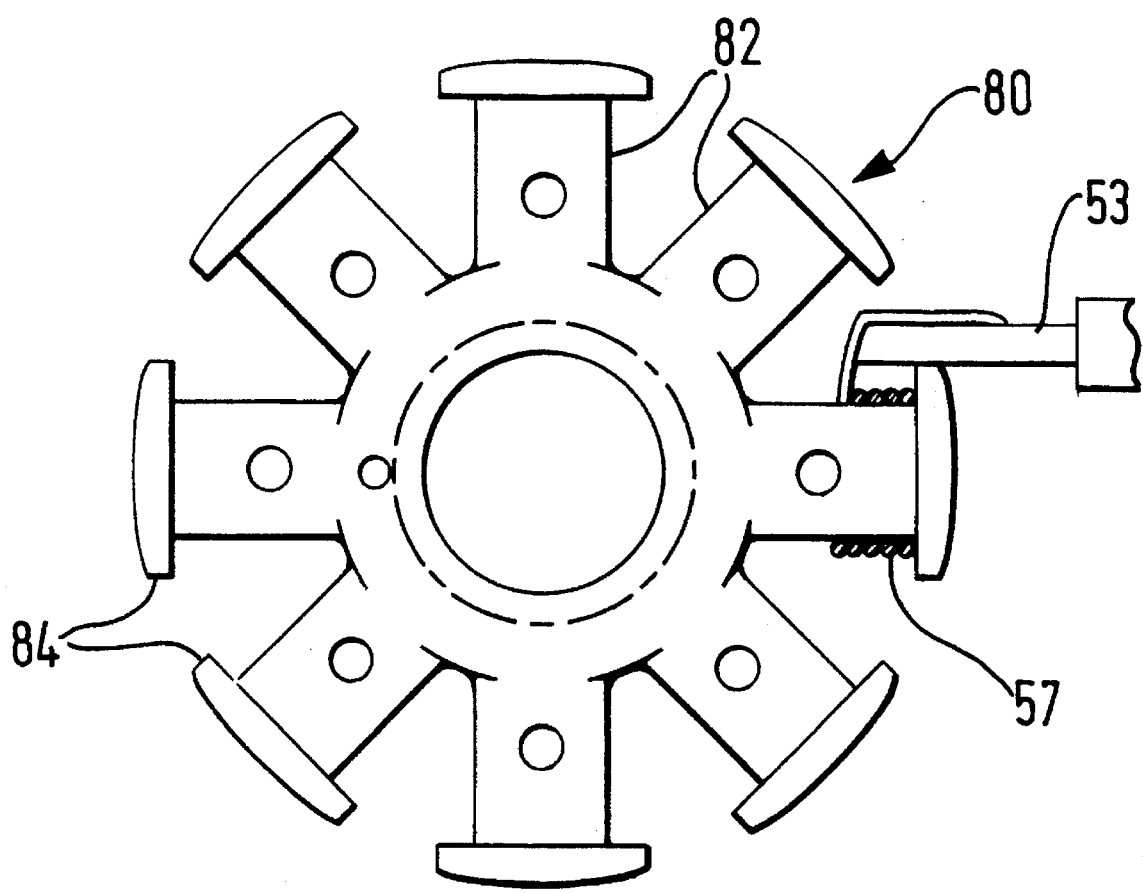
FIG. 10 is a diagrammatic end elevation of a rotor having poles on which wire is to be wound by apparatus in accordance with the invention, the poles having projecting pole tips.

FIG. 10 shows a rotor 80 having a plurality of regularly spaced, circumferentially arranged, radially extending poles 82. FIGS. 10 shows a similar device to that described in relation to FIGS. 1 to 9 and parts corresponding to parts in those figures carry the same reference numerals.

Wire 57 is to be wound around the poles 82. The poles 82 have pole insulators 84 at their tips which project outwardly of the poles on all sides thereof.

As shown in FIG. 10, the winding needle 53 winds the wire 57 around the poles 82 and the pole insulators 84 serve the same purpose as the winding shields 22 in the FIGS. 1 to 3 stator.

As the needle 53 moves towards a corner of the pole insulator 84 the rotor 80 is moved so that the insulator 84 contacts the needle 53 to effect rotation of the needle through ninety degrees. That allows the needle to wind wire 57 along a transverse face of the pole 82.

The pole insulators 84 retain the wire windings on the pole during winding.

The invention can be used for winding wire on a stator or rotor of an electric motor or an electric generator.

We claim:

1. An apparatus for winding layers of wire on a pole of a rotor or stator of a rotary electric generator or motor, the apparatus comprising:

a needle mounting member movable substantially axially of said rotor or stator, and an elongate needle rotatably mounted on said mounting member and extending transversely thereto, said needle having a longitudinal axis transverse to the direction of movement of said mounting member and about which the needle rotates, the needle having an outlet path for wire to one side of said longitudinal axis of said needle.

2. An apparatus according to claim 1 in which said needle defines a groove at a distal end thereof, said groove extending away from the longitudinal axis of the needle to define said outlet path.

3. An apparatus according to claim 1 in which said needle has a first section and a second section and is arranged so that said first section is mounted in bearing means to facilitate rotation thereof and said second section extends from said first section to one side of said longitudinal axis of said needle, said second section having said distal end at which said path is formed.

4. An apparatus according to claim 3 in which the second section is of substantially rectangular cross-section having one dimension greater than the other and with its greater dimension extending in the direction of said path.

5. An apparatus for winding layers of wire on a pole of a rotor or stator of a rotary electric generator or motor, the apparatus comprising:

a needle mounting member movable substantially axially of said rotor or stator, and a needle rotatably mounted on said mounting member and extending transversely thereto, said needle being rotatable about an axis transverse to the direction of movement of said mounting member and having an outlet path for wire to one side of said axis of rotation of said needle, said needle being arranged to contact a projecting member positioned on said pole, which member projects beyond an axial end of said pole to keep said wire wound thereon during the winding process, said needle and said projecting member being arranged to make contact with each other as said needle changes from winding said wire on one side of said pole following movement of said needle axially of said rotor or stator to winding said wire on an end of said pole.

6. An apparatus according to claim 5 in which said contact between said projecting member and said needle is arranged to turn said needle about its axis of rotation.

7. An apparatus according to claim 6 in which said contact between said projecting member and said needle is arranged to turn said needle through substantially ninety degrees.

8. An apparatus according to claim 7 in which said needle and projecting member are arranged to make contact with each other for a second time as said needle changes from winding said wire across said end of said pole to winding said wire along the other side of said pole.

9. An apparatus according to claim 8 in which said second contact is arranged to turn said needle about its axis of rotation by up to ninety degrees.

10. An apparatus according to claim 6 in which said needle and projecting member are arranged to make contact with each other for a second time as said needle changes from winding said wire across said end of said pole to winding said wire along the other side of said pole.

11. An apparatus according to claim 10 in which said second contact is arranged to turn said needle about its axis of rotation by up to ninety degrees.

12. An apparatus according to claim 5, in which said needle and projecting member are arranged to make contact with each other for a second time as said needle changes from winding said wire across said end of said pole to winding said wire along the other side of said pole.

13. An apparatus according to claim 12 in which said second contact is arranged to turn said needle about its axis of rotation by up to ninety degrees.

14. A method of winding layers of wire on a pole of a rotor or stator of a rotary electric generator or motor comprising the steps of:

providing an elongate needle having a longitudinal axis and an outlet path to one side of said longitudinal axis for wire to be wound in layers, moving said needle over a winding path, and, causing said needle to rotate about its longitudinal axis at positions in said winding path.

15. A method of winding layers of wire on a pole of a rotor or stator or a rotary electric generator or motor comprising the steps of:

providing a needle having an outlet path for wire to be wound in layers, moving said needle over a winding path, causing said needle to rotate at positions in said winding path, providing a projecting member positioned on said pole, which member projects beyond an axial end of said pole to keep said wire wound thereon during the winding process, and causing said needle and said projecting member to make contact with each other as said needle changes from winding said wire on one side of said pole following movement of said needle axially of said rotor or stator to winding said wire on an end of said pole.

16. A method according to claim 15 in which said contact between said projecting member and said needle is arranged to turn said needle about its axis of rotation.

17. A method according to claim 16 in which said contact between said projecting member and said needle is arranged to turn said needle through substantially ninety degrees.

18. A method according to claim 17 further comprising the step of:

causing said needle and projecting member to make contact with each other again as said needle changes from winding said wire across said end of said pole to winding said wire along the other side of said pole.

19. A method according to claim 18 in which said second contact is arranged to turn said needle about its axis of rotation.

20. A method according to claim 19 in which said second contact is arranged to turn said needle by up to ninety degrees.

21. A method according to claim 16 further comprising the step of:

causing said needle and projecting member to make contact with each other again as said needle changes from winding said wire across said end of said pole to winding said wire along the other side of said pole.

22. A method according to claim 21 in which said second contact is arranged to turn said needle about its axis of rotation.

23. A method according to claim 22 in which said second contact is arranged to turn said needle by up to ninety degrees.

24. A method according to claim 15, further comprising the step of:

causing said needle and projecting member to make contact with each other again as said needle changes from winding said wire across said end of said pole to winding said wire along the other side of said pole.

25. A method according to claim 24 in which said second contact is arranged to turn said needle about its axis of rotation.

26. A method according to claim 25 in which said second contact is arranged to turn said needle by up to ninety degrees.

* * * * *